United States Patent
Park

(10) Patent No.: US 6,573,624 B2
(45) Date of Patent: Jun. 3, 2003

(54) STATOR STRUCTURE OF A RECIPROCATING MOTOR HAVING A PLURALITY OF UNIT-STACKED CORE MEMBERS

(75) Inventor: Kyeong Bae Park, Gwangmyoung (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/987,144

(22) Filed: Nov. 13, 2001

(65) Prior Publication Data

US 2002/0105247 A1 Aug. 8, 2002

(30) Foreign Application Priority Data

Feb. 2, 2001 (KR) .......................................... 2001-5118

(51) Int. Cl.[7] .............................................. H02K 41/00
(52) U.S. Cl. .......................... 310/12; 310/254; 310/91; 310/58; 310/85; 310/89; 310/71; 29/596; 29/606; 264/272.2
(58) Field of Search ............................. 310/30, 88, 218, 310/180, 179, 15, 208, 216, 43, 254, 14, 12; 29/596, 606; 264/272.19, 272.2

(56) References Cited

U.S. PATENT DOCUMENTS

| | | | | |
|---|---|---|---|---|
| 3,792,299 A | * | 2/1974 | Hallerback | 310/258 |
| 3,963,949 A | * | 6/1976 | Church | 310/43 |
| 4,149,133 A | * | 4/1979 | Hilgert | 336/134 |
| 4,538,086 A | * | 8/1985 | Marsh et al. | 310/258 |
| 4,782,316 A | * | 11/1988 | Domeki et al. | 335/299 |
| 4,881,001 A | * | 11/1989 | Patel et al. | 310/258 |
| 5,315,190 A | * | 5/1994 | Nasar | 310/12 |
| 5,508,578 A | * | 4/1996 | Suzuki et al. | 310/254 |
| 5,634,258 A | * | 6/1997 | Onodera et al. | 29/598 |
| 5,763,978 A | * | 6/1998 | Uchida et al. | 310/215 |
| 5,798,583 A | * | 8/1998 | Morita | 310/42 |
| 5,844,332 A | * | 12/1998 | Lee | 310/12 |
| 5,982,057 A | * | 11/1999 | Imada et al. | 310/43 |
| 6,002,191 A | * | 12/1999 | Saban | 310/216 |
| 6,060,810 A | * | 5/2000 | Lee et al. | 310/254 |
| 6,121,711 A | * | 9/2000 | Nakahara et al. | 310/254 |
| 6,166,474 A | * | 12/2000 | Kohara et al. | 310/258 |
| 6,329,728 B1 | * | 12/2001 | Kitazawa et al. | 310/14 |

FOREIGN PATENT DOCUMENTS

| | | | | |
|---|---|---|---|---|
| JP | 06090543 A | * | 7/1993 | H02K/5/128 |
| JP | 05260719 A | * | 10/1993 | H02K/44/06 |
| JP | 05284705 A | * | 10/1993 | H02K/21/22 |
| JP | 06014487 A | * | 1/1994 | H02K/3/32 |
| JP | 06098491 A | * | 4/1994 | H02K/3/44 |
| JP | 07280373 A | * | 10/1995 | F25B/9/14 |

* cited by examiner

*Primary Examiner*—Karl Tamai
*Assistant Examiner*—Heba Yousri M. Elkassabgi
(74) *Attorney, Agent, or Firm*—Birch, Stewart, Kolasch & Birch, LLP

(57) ABSTRACT

A stator structure of a reciprocating motor is provided. In the stator structure of a reciprocating motor, a bobbin around a coil is wound; a plurality of unit stacked core members of a predetermined thickness, each of which is formed by stacking a plurality of lamination sheets formed of predetermined shaped thin plates, and radially positioned on the outer circumference of the bobbin; and an injection insulator combining the plurality of unit stacked bobbins to an outer circumference of the bobbin. Accordingly, it is possible to reduce the number of parts that form the stator and to simplify the structure of the stator. Therefore, it is possible to reduce the time required for assembling the parts and reduce the processes of assembling the parts, to thus improve assembly productivity.

3 Claims, 4 Drawing Sheets

STATOR STRUCTURE OF A RECIPROCATING MOTOR HAVING A PLURALITY OF UNIT-STACKED CORE MEMBERS

BACKGROUND OF THE INVENTION

1. Field of the Invention

The present invention relates to a stator structure of a reciprocating motor, and more particularly, to a stator structure of a reciprocating motor, which is capable of reducing the number of parts, and of simplifying assembly of the structure.

2. Description of the Background Art

In general, a reciprocating motor is formed by making the flux of a common three-dimensional motor plane. A plane moving part linearly moves on a plane according to a change in the flux formed on a plane fixed part. The reciprocating motor according to the present invention can be in a linear reciprocating motion by attaching a plurality of plane magnets to the cylindrical circumference of a stator by applying the above principle.

FIGS. 1 and 2 respectively show an example of the reciprocating motor. As shown in FIGS. 1 and 2, the reciprocating motor includes a stator S consisting of a cylindrical outer core 10 and a cylindrical inner core 20, which is inserted into the outer core 10, a winding coil 30 combined with the outer core 10 or the inner core 20 inside the outer core 10 or the inner core 20, and a moving magnet 40, which includes permanent magnets 41, and is inserted between the outer core 10 and the inner core 20 to be movable. In FIGS. 1 and 2, the winding coil is combined with the outer core.

In the above-mentioned reciprocating motor, when current flows through the winding coil 30, flux is formed around the winding coil 30 due to the current that flows through the winding coil 30. The flux forms a closed loop along the outer core 10 and the inner core 20, which form the stator S.

Because the permanent magnets 41 receive force in an axial direction due to the mutual action between the flux formed in the outer core 10 and the inner core 20 and the flux formed by the permanent magnets 41, the moving magnet 40 is in a linear motion in the axial direction between the outer core 10 and the inner core 20. When the direction of the current applied to the winding coil 30 is alternately changed, the moving magnet 40 is in a linear reciprocating motion.

The outer core 10 is comprised of cylindrical stacked core members formed by radially stacking lamination sheets 11, which are thin plates of a predetermined shape. The stacked core members are fixed by a fixing ring 12.

The cylindrical stacked core members consists of a path a, whose section is U-shaped, and triangular poles b formed in both ends of the path a. The winding coil 30 is positioned inside an opening groove H formed by the poles b and the path a. A bobbin 50 is used for forming the winding coil 30 in order to secure electrical insulation and for the convenience of fabrication. The winding coil 30 is formed by winding a coil around the bobbin 50 in multiple layers. The inner core 20 is comprised of cylindrical stacked core members formed by radially stacking lamination sheets 21, which thin plates having a predetermined shape. Because the length of the permanent magnets 41 is determined by the length of the poles b and the width of the opening groove H and the permanent magnets 41 are expensive, the poles b that determine the width of the opening groove H are triangular and the ends of the poles b form poles in order to minimize the use of the permanent magnets 41.

However, according to the above structure, because the plurality of lamination sheets 11 must be radially stacked to be cylindrical in fabricating the outer core 10 including the winding coil 30, it takes a long time to stack the lamination sheets 11. Also, because the stacked core members are fixed by the fixing ring 12 after being stacked, it takes a long time to assemble the outer core 10. Accordingly, assembly productivity deteriorates.

Also, because the outer core 10 is assembled by press fitting the fixing ring 12 in the stacked core members formed by stacking the plurality of lamination sheets 11, it is difficult to control the assembly strength of the stacked core members and to precisely process the fixing ring 12.

SUMMARY OF THE INVENTION

Therefore, an object of the present invention is to provide a stator structure of a reciprocating motor, which is capable of reducing the number of parts, and of simplifying an assembly structure.

To achieve these and other advantages and in accordance with the purpose of the present invention, as embodied and broadly described herein, there is provided a stator structure of a reciprocating motor, in which a bobbin 50 around which a coil 30 is wound; a plurality of unit stacked core members 61 of a predetermined thickness, each of which is formed by stacking a plurality of lamination sheets L and L' formed of predetermined shaped thin plates, and radially positioned on the outer circumference of the bobbin 50; and an injected insulator 70 combining the plurality of unit stacked core members 61 to an outer circumference of the bobbin 50.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

A reciprocating motor stator assembly structure according to the present invention will now be described in detail with reference to an embodiment shown in the accompanying drawings.

Figure 1:
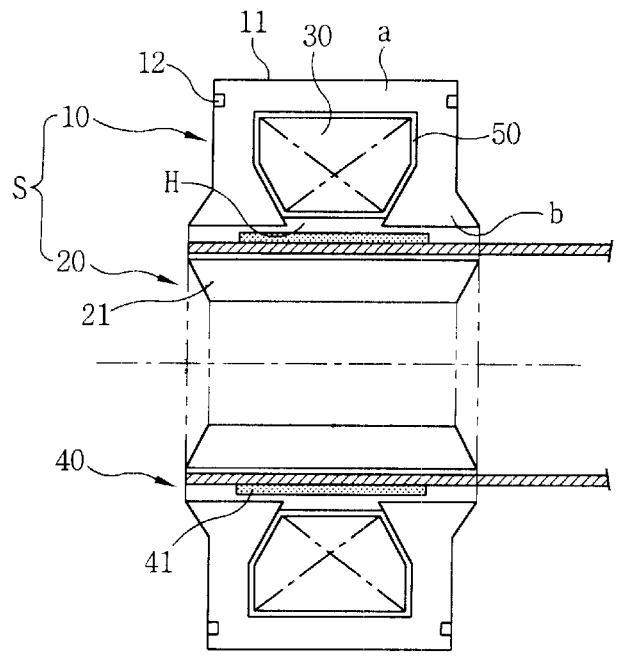
FIG. 1 is a sectional view showing an example of a conventional reciprocating motor.
Figure 2:
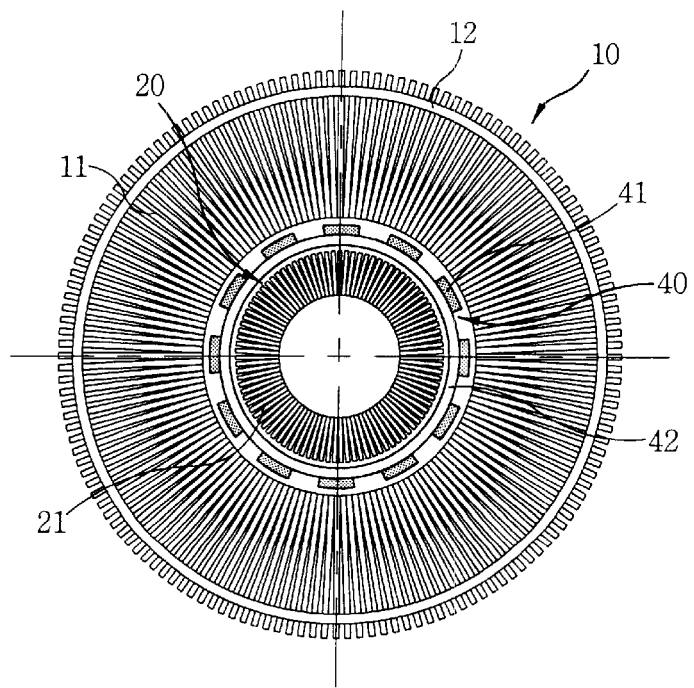
FIG. 2 is a side view showing the example of the conventional reciprocating motor.
Figure 3:
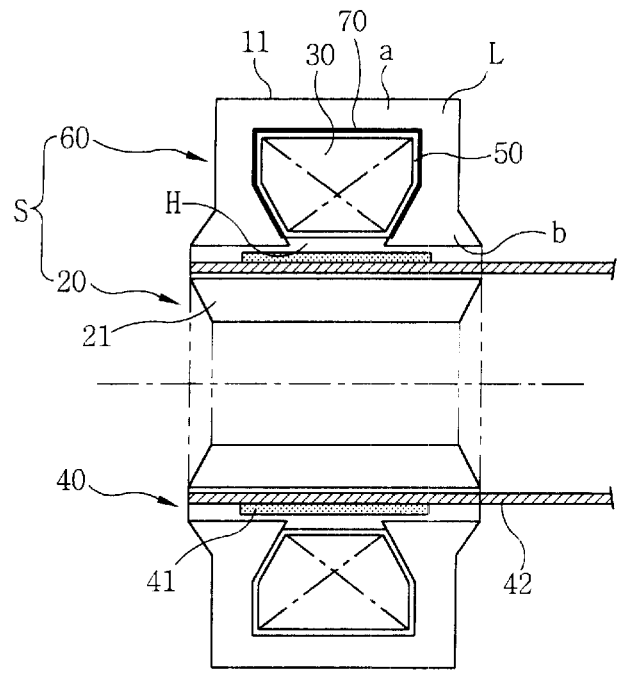
FIG. 3 is a sectional view showing a reciprocating motor including a reciprocating motor stator assembly structure according to the present invention.
Figure 4:
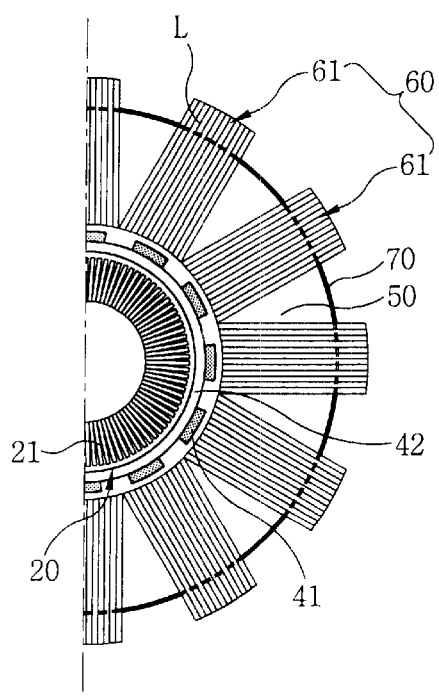
FIG. 4 is a side view showing the reciprocating motor including the reciprocating motor stator assembly structure according to the present invention.

FIGS. 3 and 4 show a reciprocating motor including an example of the reciprocating motor stator assembly structure according to the present invention. The reciprocating motor includes a stator S consisting of an outer core 60 and a cylindrical inner core 20 inserted into the outer core 60, a winding coil 30 combined with the outer core 60 or the inner core 20 inside the outer core 60 or the inner core 20, and a moving magnet 40, which includes permanent magnets 41 and is inserted between the outer core 60 and the inner core 20 to be movable. In FIGS. 3 and 4, the winding coil 30 is combined with the outer core.

The outer core 60 that forms the stator S is formed by radially positioning a plurality of unit stacked core members 61 of a predetermined thickness, each of which is formed by stacking a plurality of lamination sheets L, on a ring-shaped bobbin 50, around which a coil is wound, to be separated from each other by a predetermined distance. The plurality of unit stacked core members 61 are combined with the bobbin 50 by an injected insulator 70.

The inner circumference of the plurality of unit stacked core members 61 that are radially positioned on the bobbin 50 forms a circle and the unit stacked core members 61 are positioned to be separated from each other by a predetermined distance in the outer circumference. Accordingly, some of the coil wound around the bobbin 50 is exposed to the outside.

The unit stacked core members 61, whose section is U-shaped, consists of a path a that is the path of the flux and triangular poles b formed in both ends of the path a. The bobbin 50 is positioned inside an opening groove H formed by the poles b and the path a. The winding coil 30 formed by winding coil around the bobbin 50 in multiple layers is positioned inside the opening groove H. The injected insulator 70 is injected into all over the parts, where the bobbin 50 contacts the unit-stacked core members 61. Accordingly, the bobbin 50 is combined with the unit-stacked core members 61.

Figure 5:
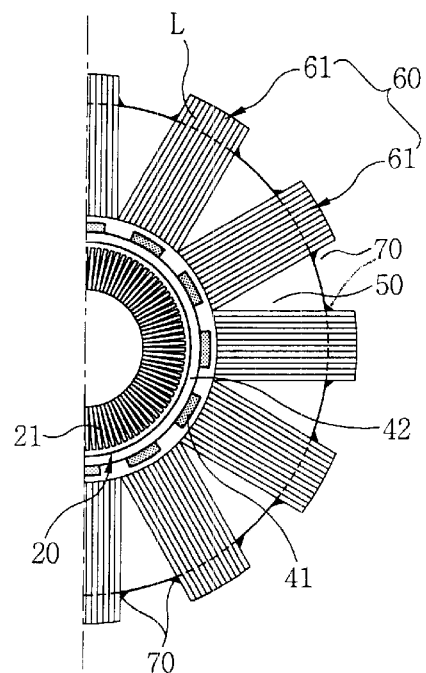
FIG. 5 is a side view showing a modification of an outer core that forms the reciprocating motor stator assembly structure according to the present invention.

In a modification of the injected insulator 70, as shown in FIG. 5, the injected insulator 70 is injected into only the edges, where the unit stacked core members 61 contact the bobbin 50, among the parts, where the unit stacked core members 61 contact the bobbin 50. Accordingly, the unit stacked core members 61 are combined with the bobbin 50.

Figure 6:
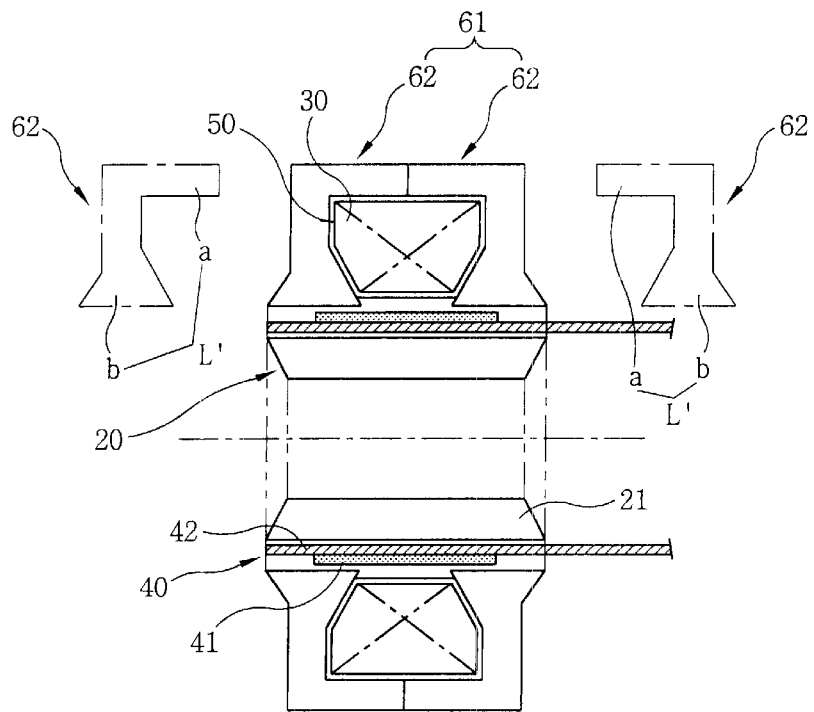
FIG. 6 is a sectional view showing another embodiment of the reciprocating motor stator assembly structure according to the present invention.
Figure 7:
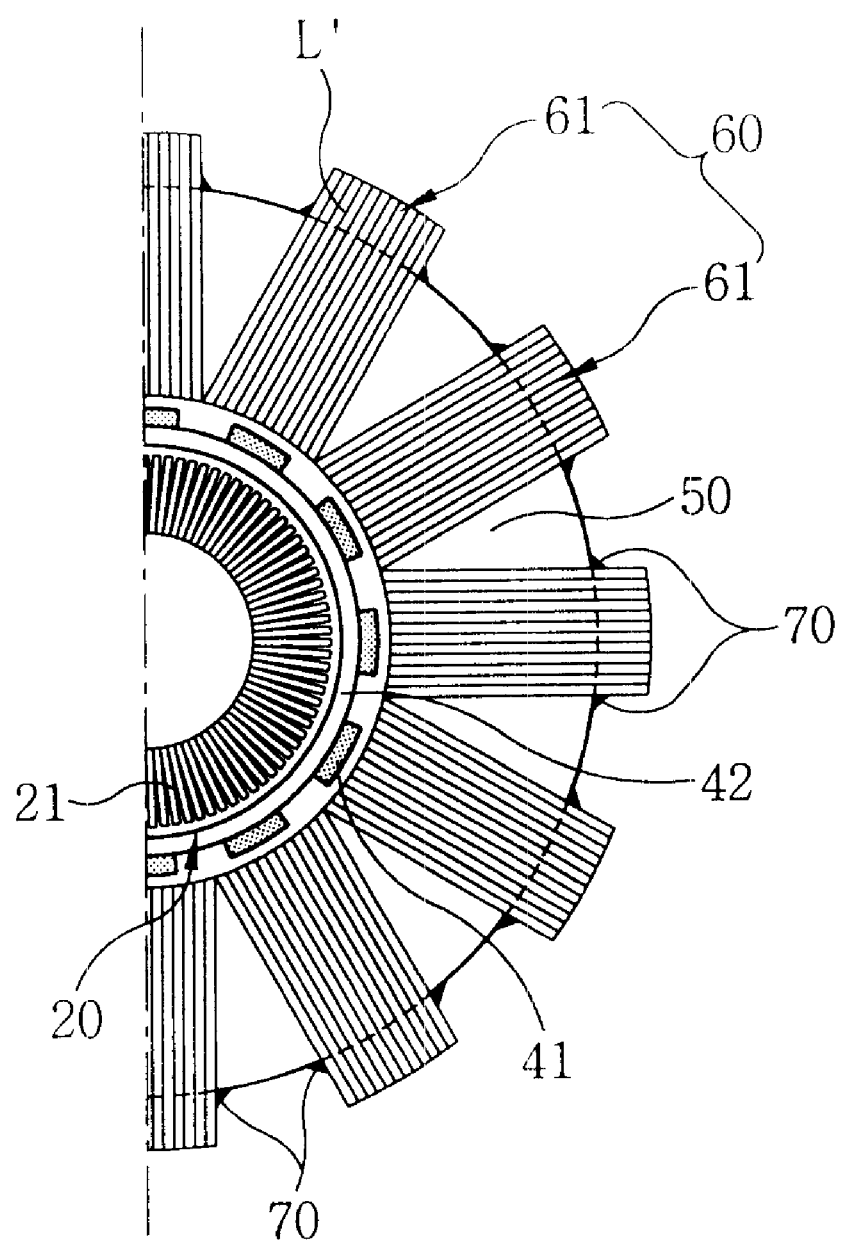
FIG. 7 is a side view showing another embodiment of the reciprocating motor stator assembly structure according to the present invention.

In a modification of the unit-stacked core members 61, as shown in FIGS. 6 and 7, the unit stacked core members 61 are formed of two division-type stacked core members 62 divided to be symmetrical. The division-type stacked core members 62 are formed by stacking a plurality of division-type lamination sheets L' consisting of the L-shaped path a and the triangular pole b formed in one side of the path a to form a predetermined thickness.

The division-type stacked core members 62 are arranged on both sides of the bobbin 50 such that the division-type stacked core members 62 are positioned on the same straight line perpendicular to the longitudinal direction of the circumference of the bobbin 50. The division-type stacked core members 62 are combined with the bobbin 50 by the injection of the injected insulator 70, to thus form the unit-stacked core members 61

The inner core 20 is formed by radially stacking the lamination sheets 21 formed by thin plates of a predetermined shape to be cylindrical and is inserted into the outer core 10 to be separated from the outer core 10 by a predetermined distance.

The moving magnet 40 is formed of the plurality of permanent magnets 41. The permanent magnets 41 are loaded in a cylindrical permanent magnet holder 42 and are inserted between the inner core 60 and the outer core 10, which form the stator S.

The efficiency of the reciprocating motor stator assembly structure according to the present invention will now be described.

In the reciprocating motor, when power is applied and current flows through the winding coil 30, the flux is formed around the winding coil 30 due to the current that flows around the winding coil 30. The flux forms the closed loop along the outer core 60 and the inner core 20, which form the stator S.

The permanent magnets 41 receive force in the axial direction due to the flux formed by the outer core 60 and the inner core 20 and the permanent magnets 41, that is, the mutual action of the fluxes. Accordingly, the moving magnet 40 is in a linear motion in the axial direction between the outer core 60 and the inner core 20. When the direction of the current applied to the winding coil 30 is alternately changed, the moving magnet 40 is in a linear reciprocating motion. The linear reciprocating motion force generated by the reciprocating motor operates as a driving source when the reciprocating motor is combined with another system.

According to the present invention, the plurality of unit stacked core members 61, each of which is formed by stacking a plurality of lamination sheets, are radially positioned on the bobbin 50 and then, the unit stacked core members 61 are combined with the bobbin 50 by the injected insulator 70. Therefore, the number of parts is small and the structure of the stator is simplified. Also, some of the bobbin 50 and some of the winding coil 30 are exposed to the outside when the injection insulator 70 is injected into the unit-stacked core members 61 and the bobbin 50. Accordingly, contaminants in the winding coil 30 are easily discharged.

As mentioned above, in the stator structure of the reciprocating motor according to the present invention, the plurality of unit stacked core members are radially positioned on the bobbin, around which a coil is wound, and the unit stacked core members are combined with the bobbin by the injected insulator. Accordingly, it is possible to reduce the number of parts and to simplify the structure of the structure, to thus reduce time for assembling the parts and the number of processes of assembling the parts. Therefore, it is possible to improve assembly productivity.

What is claimed is:

1. A stator structure of a reciprocating motor, comprising:
   a bobbin, around which a coil is wound;
   a plurality of unit stacked core members of a predetermined thickness, each of which is formed by stacking a plurality of lamination sheets formed of predetermined shaped thin plates, and radially positioned on the outer circumference of the bobbin; and
   an injected insulator, combining the plurality of unit stacked bobbins to an outer circumference of the bobbin, said injected insulator being injected into only edges where the unit stacked core members contact the bobbin, to combine the unit stacked core members with the bobbin.

2. The stator structure of claim 1, wherein each of the unit stacked core members includes two symmetrical division-type stacked core members.

3. The stator structure of claim 1, wherein a part of the outer circumference of the bobbin is exposed to allow contaminants inside the coil to be easily discharged.

* * * * *